(12) United States Patent
Bastelberger et al.

(10) Patent No.: US 6,590,022 B1
(45) Date of Patent: Jul. 8, 2003

(54) PROCESS FOR PREPARING PROTECTIVE-COLLOID-STABILIZED VINYLAROMATIC-1,3-DIENE COPOLYMERS

(75) Inventors: Thomas Bastelberger, Emmerting (DE); Reinhard Haerzschel, Burghausen (DE); Theo Mayer, Julbach (DE); Peter Weitzel, Reischach (DE); Peter Ball, Emmerting (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/555,591

(22) PCT Filed: Nov. 19, 1998

(86) PCT No.: PCT/EP98/07446

§ 371 (c)(1), (2), (4) Date: May 31, 2000

(87) PCT Pub. No.: WO99/28360

PCT Pub. Date: Jun. 10, 1999

(30) Foreign Application Priority Data

Dec. 2, 1997 (DE) .......................... 197 53 422

(51) Int. Cl.$^7$ .............................. C08F 2/16; C08K 3/20; C08L 9/08; C08L 9/10; C08L 9/04; C08L 11/02; C08L 13/02; C08L 19/02; C08L 21/02

(52) U.S. Cl. ...................... 524/459; 524/458; 524/460; 528/199; 528/200; 528/201; 528/208

(58) Field of Search ................. 526/199, 200, 526/201, 203, 208; 524/458, 459, 460

(56) References Cited

U.S. PATENT DOCUMENTS

| | | | |
|---|---|---|---|
| 3,714,100 A | * | 1/1973 | Biale et al. ............ 260/29.67 A |
| 4,299,903 A | | 11/1981 | AuClair et al. |
| 4,397,968 A | | 8/1983 | Eck et al. |
| 5,147,907 A | | 9/1992 | Rinck et al. |
| 5,200,459 A | | 4/1993 | Weih et al. |
| 6,262,167 B1 | * | 7/2001 | Weitzel et al. ............ 524/513 |

FOREIGN PATENT DOCUMENTS

| | | |
|---|---|---|
| DE | 4212768 | 10/1993 |
| EP | 62106 | 10/1982 |
| EP | 0408099 | 1/1991 |
| EP | 538571 | 4/1993 |
| WO | 96/17891 | 6/1996 |
| WO | 96/20963 | 7/1996 |
| WO | 96/41825 | 12/1996 |
| WO | 97/15603 | 5/1997 |

OTHER PUBLICATIONS

Derwent Abstract corresponding to DE–A 4212768 [AN 1993–329243(42)].
T.G. Fox, Bull. Am. Physics Soc. 1, 3, p. 123 (1956).
Polymer Handbook, 2$^{nd}$ Edition, J. Wiley & Sons, New York (1975).
Derwent Abstract corresponding to WO 96/17891 [AN 1996–287139].
Derwent Abstract corresponding to WO 96/20963 [AN 1996–333950].
Derwent Abstract corresponding to WO 96/41825 [AN 1997–065428].
Derwent Abstract corresponding to EP 538571 [AN 1993–135540].

* cited by examiner

Primary Examiner—James J. Seidleck
Assistant Examiner—U. K Rajguru
(74) Attorney, Agent, or Firm—Brooks & Kushman P.C.

(57) ABSTRACT

A method is provided for producing protective colloid-stabilized vinyl aromatic-1.3-diene-copolymers in the form of their aqueous polymer dispersions or in the form of a powder which can be re-dispersed in water, by emulsion-polymerizing a mixture containing at least one vinyl aromatic and at least one 1,3-diene in the presence of a protective colloid and optionally, drying the resulting polymer dispersions. In the method part of the protective colloid is provided straightaway and part is metered.

18 Claims, No Drawings

PROCESS FOR PREPARING PROTECTIVE-COLLOID-STABILIZED VINYLAROMATIC-1,3-DIENE COPOLYMERS

BACKGROUND OF THE INVENTION

1) Field of the Invention

The invention relates to a process for preparing protective-colloid-stabilized vinylaromatic-1,3-diene copolymers.

2) Background Art

Protective-colloid-stabilized polymers, especially in the form of their aqueous dispersions or in the form of their water-redispersible polymer powders, are used in a wide variety of applications, for example as coating compositions or adhesives for a very wide variety of substrates. Polymers whose preparation in aqueous media, for example by emulsion polymerization, involves stabilization by emulsifiers, tend to have high water absorption when used, due, to the emulsifier content. When they are used as an adhesive, for example, they have reduced bonding power.

These disadvantages can be overcome by stabilizing the polymerization mixture exclusively with protective colloids. The protective-colloid-stabilized aqueous polymer dispersions and protective-colloid-stabilized polymer powders which have so far become established are especially those based on vinyl ester homopolymers or vinyl ester copolymers, specifically polyvinyl acetate or vinyl acetate-ethylene copolymers. The reason for this is that the stabilizing effect developed by protective colloids is generally lower than that of emulsifiers, so that complete replacement of emulsifiers by protective colloids has hitherto given satisfactory products only with relatively hydrophilic polymers, such as the abovementioned vinyl ester polymers.

However, polymers with any hydrophobic character, such as styrene-butadiene copolymers, are preferred in many applications, and the polymerization of polymers of this type requires effective stabilization. Styrene-butadiene copolymers are therefore generally polymerized in an aqueous phase in the presence of emulsifiers. The hydrophilic character of the emulsifier content present, however, counteracts to some extent the hydrophobic properties of the copolymer when emulsifier-stabilized styrene-butadiene copolymers are used.

In particular when polymers are used in the form of their redispersion powders, for improving mortar properties, a main application sector for redispersion powders, the formulations have to remain stable for a certain time and must not change their working consistency significantly (cement stability). This is because the user cannot be expected to remix at frequent intervals. In the concrete and mortar industry a significant role is played by mechanical properties, such as compressive strength and porosity, and the associated air pore content. If too many air pores are present there is a severe reduction in compressive strength, and if too few or no air pores are present in the mortar or concrete, the building material has insufficient resistance to frost and condensation. In addition, the hydraulically setting systems modified with the dispersion powder should provide adhesion which is even better than that of unmodified systems.

WO-A 96/17891 discloses water-redispersible dispersion powders based on styrene-butadiene copolymers. The powders are obtainable by emulsion polymerization in the presence of emulsifiers. Prior to drying, monosaccharide, polyvinylpyrrolidone and, if desired, emulsifier are then added to the dispersion. WO-A 96/20963 discloses a process for preparing water-redispersible polymer powders based on styrene-butadiene polymers. The polymers here are prepared by two-stage polymerization in the presence of emulsifier to give core-shell polymers, and are spray dried. WO-A 96/41825 likewise relates to dispersion powders based on core-shell polymers. The shell here has saccharide-functional comonomers and crosslinkable comonomers for covalent linking of the shell to the core. In addition to the relatively complicated procedure for preparing the redispersion powders, these powders have the disadvantages discussed above of emulsifier-stabilized styrene-butadiene copolymers, and in addition they have unsatisfactory performance, specifically ease of use with regard to cement stability.

WO-A 97/15603 relates to protective-colloid-stabilized emulsion polymers of conjugated dienes, with mercaptosilanes copolymerized to improve the protective-colloid action. Disadvantages here are that the polymerization uses emulsifiers as well as the protective-colloid and especially that the copolymerization of mercaptosilane, which is an essential requirement, makes the preparation more expensive and is undesirable for many applications since it reduces the degree of crosslinking of the butadiene units.

EP-A 538571 relates to a process for preparing protective-colloid-stabilized polymer dispersions based on polymers having more than 50% content of styrene and/or of (meth) acrylate. All of the polyvinyl alcohol used for stabilization is used as an initial charge, and specific initiator systems are used to adjust hydrophilic properties and viscosity. In the examples, stable dispersions are obtained with styrene, butyl acrylate and acrylamide. A disadvantage is that this process does not give stable dispersions from the copolymerization of styrene and butadiene.

EP-B 62106 discloses a procedure for preparing polyvinyl-alcohol-stabilized polymer dispersions based on styrene units and/or on (meth)acrylate units. The minimum temperature for the procedure is above 65° C., and it is carried out in the presence of organic initiators or peroxosulphur compounds, an by feeding the main portion of the monomers. The preparation of styrene-butadiene copolymers is not dealt with.

U.S. Pat. No. 5,200,459 describes a process for preparing polyvinyl-alcohol-stabilized butadiene copolymers, in the presence of a water-miscible solvent to ensure dispersion stability.

DE-A 4212768 relates to a process for preparing synthetic-polymer dispersions, inter alia styrene-butadiene copolymer dispersions. These are prepared without addition of emulsifier, but instead of this in the presence of a copolymerizable macromonomer based on crosslinking products of polyalkylene glycols and maleic acid or fumaric acid.

U.S. Pat. No. 4,299,903 teaches the preparation of an emulsifier-free toner resin based on styrene-butadiene by copolymerization in the presence of a "charge control agent" selected from the group consisting of quaternary ammonium salts or alkylpyridinium compounds.

The object of the invention was therefore to provide a process which can give access to protective-colloid-stabilized vinylaromatic-1,3-diene copolymers without addition of other auxiliaries to stabilize the polymerization mixture. The products of the process should have entirely satisfactory cement stability, in particular when used with hydraulic binders.

SUMMARY OF THE INVENTION

The invention provides a process for preparing protective-colloid-stabilized vinylaromatic-1,3-diene copolymers in the form of their aqueous polymer dispersions or in the form of their water-redispersible powders, by emulsion polymerization of a mixture comprising at least one vinylaromatic and comprising at least one 1,3-diene in the presence of protective colloid, and, if desired, drying the resultant polymer dispersions, characterized in that some of the protective colloid is used as an initial charge and some of the protective colloid is used as a feed.

DESCRIPTION OF THE PREFERRED EMBODIMENTS

Suitable vinylaromatics are styrene and methylstyrene, preferably styrene. Examples of 1,3-dienes are 1,3-butadiene and isoprene, preferably 1,3-butadiene. The polymerization is generally carried out using mixtures with from 20 to 80% by weight of vinylaromatic and from 20 to 80% by weight of 1,3-diene, and the mixtures may, if desired, also comprise further monomers and the per cent by weight data always give a total of 100% by weight.

Based on the total weight of the monomer phase, up to 30% by weight of other monomers copolymerizable with vinylaromatics and with 1,3-dienes may also be polymerized, for example ethylene, vinyl chloride, (meth) acrylates of alcohols having from 1 to 15 carbon atoms or vinyl esters of unbranched or branched carboxylic acids.

Based on the total weight of the monomer mixture, from 0.05 to 10% by weight of auxiliary monomers may also be copolymerized. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric or maleic acid, such as the diethyl and diisopropyl esters, and also maleic anhydride, ethylenically unsaturated sulphonic acids and salts of these, preferably vinylsulphonic acid, and 2-acrylamido-2-methylpropanesulphonic acid. Other examples are pre-crosslinking comonomers, such as unsaturated comonomers having two or more ethylenic unsaturated double bonds, e.g. divinyl adipate, diallyl maleate, allyl methacrylate or triallyl cyanurate, or postcrosslinking comonomers, e.g. acrylamidoglycolic acid (AGA), methyl methacrylamidoglycolate (MAGME), N-methylolacrylamide (NMA), N-methylolmethacrylamide, allyl N-methylolcarbamate, alkyl ethers, such as the isobutoxy ether, or esters of N-methylolacrylamide, of N-methylolmethacrylamide, or of allyl N-methylol carbamate. Other suitable auxiliary monomers are epoxy-functional comonomers, such as glycidyl methacrylate or glycidyl acrylate. Other examples of auxiliary monomers are silicon-functional comonomers other than mercapto silanes, e.g. acryloxypropyltri(alkoxy)- and meth acryloxypropyltri(alkoxy)silanes, vinyltrialkoxysilanes and vinylmethyldialkoxysilanes, and examples of alkoxy groups which may be present here are ethoxy ether radicals and ethoxypropylene glycol ether radicals. Mention may also be made of monomers having hydroxyl or CO groups, such as hydroxyalkyl (meth)acrylates, e.g. hydroxyethyl, hydroxypropyl or hydroxybutyl (meth)-acrylate, and also compounds such as diacetone-acrylamide and acetylacetoxyethyl(meth)acrylate.

The selection of monomers and the selection of the proportions by weight of the comonomers here takes place in such a way that the resultant glass transition temperature Tg is generally from −50° C. to +50° C., preferably from −20° C. to +40° C. The glass transition temperature Tg of the polymers may be determined in a known manner by differential scanning calorimetry (DSC). The Tg may also be approximated by the Fox equation. According to T. G. Fox, Bull. Am. Physics Soc. 1, 3, page 123 (1956): $1/Tg = x_1/Tg_1 + x_2/Tg_2 + \ldots + x_n/Tg_n$, where $x_n$ is the proportion by weight (% by weight/100) of monomer n and $Tg_n$ is the glass transition temperature in degrees Kelvin of the homopolymer of monomer n. Tg values for homopolymers are listed in Polymer Handbook $2^{nd}$ Edition, J. Wiley & Sons, New York (1975).

The protective-colloid-stabilized polymers are prepared by emulsion polymerization, generally with a polymerization temperature of from 40 to 100° C., preferably from 60 to 90° C. When gaseous comonomers, such as ethylene or vinyl chloride, are copolymerized it is also possible to operate under pressure, generally between 5 bar and 100 bar.

The polymerization is initiated with the redox-initiator combinations or initiators usually used for emulsion polymerization. Examples of suitable organic initiators are hydroperoxides, such as tert-butyl hydroperoxide, tert-butyl peroxopivalate, cumene hydroperoxide, or isopropylbenzene monohydroperoxide, and azo compounds, such as azobisisobutyronitrile. Suitable inorganic initiators are the sodium, potassium and ammonium salts of peroxodisulphuric acid. The initiators mentioned are generally used in amounts of from 0.05 to 3% by weight, based on the total weight of the monomers.

The redox initiators used are combinations of the initiators mentioned with reducing agents. Suitable reducing agents are the sulphites and bisulphites of alkaline metals and of ammonium, for example sodium sulphite, the derivatives of sulphoxylic acid, such as the formaldehyde-sulphoxylate of zinc or of an alkaline metal, e.g. sodium hydroxymethanesulphinate, and ascorbic acid. The amount of reducing agent is preferably from 0.01 to 5.0% by weight, based on the total weight of the monomers.

To control the molecular weight, regulating substances may be used during the polymerization. They are usually used in amounts of from 0.01 to 5.0% by weight, based on the monomers to be polymerized, and are fed separately or else dosed in a form premixed with reaction components. Examples of substances of this type are n-dodecyl mercaptan, tert-dodecyl mercaptan, mercaptopropionic acid, methyl mercapto propionate, isopropanol and acetaldehyde.

The polymerization mixture is stabilized by protective colloids, with no emulsifiers added. Suitable protective colloids are fully or partially hydrolysed polyvinyl acetates. Partially hydrolysed hydrophobicized polyvinyl acetates are also suitable, and the hydrophobicization may, for example, take place by copolymerization with isopropenyl acetate, ethylene or vinyl esters of saturated alpha-branched mono-carboxylic acids having from 5 to 11 carbon atoms. Other examples of protective colloids are polyvinyl pyrrolidones; polysaccharides in a water-soluble form, such as starches (amylose and amylopectin), celluloses and their carboxymethyl, methyl, hydroxyethyl or hydroxypropyl derivatives; proteins, such as casein or caseinate, soy protein, gelatine; ligninsulphonate; synthetic polymers, such as poly(meth)acrylic acid, copolymers of (meth)acrylates with carboxy-functional comonomer units, poly(meth) acrylamide, polyvinyl sulphonic acids and water-soluble copolymers of these; melamine-formaldehydesulphonates, napthaleneformaldehydesulphonates, styrene-maleic acid copolymers, vinyl ether-maleic acid copolymers, and dextrins, such as yellow dextrin.

Preference is given to said partially hydrolysed polyvinyl acetates and partially hydrolysed hydrophobicized polyvinyl acetates. Particular preference is given to partially hydrolysed polyvinyl acetates with a degree of hydrolysis of from 80 to 95 mol % and with a Höppler viscosity (4% strength aqueous solution, DIN 53015, Höppler method at 20° C.) of from 1 to 30 mPas, preferably from 2 to 15 mPas.

The amount of the protective colloids added during the polymerization is generally from 1 to 15% by weight in total, based on the total weight of the monomers. Some of this content of protective colloid is an initial charge and some is fed after initiating the polymerization. From 2 to 90% by weight, preferably from 30 to 85% by weight, of the protective colloid content is usually used as initial charge, based in each case on the total weight of the protective colloid content, and the remainder is fed. A significant factor in deciding the proportion by weight of collective colloid to be used as an initial charge here is the content of monomer in the initial charge. The initial charge and the feed of the protective colloid here are adjusted so that the protective colloid ratio, based on the content of monomer in the initial charge, is from 0.1:1 to 0.9:1. During the polymerization monomer and protective colloid are then fed in such a way that the amount of protective colloid present after the polymerization has ended is from 1 to 15% by weight in total, based on the total weight of the monomers.

The monomers may be used entirely as an initial charge, entirely as a feed, or some proportion may be used as an initial charge and the remainder fed after the polymerization has been initiated. A preferred procedure is to use from 10 to 25% by weight, based on the total weight of the monomers, as an initial charge and to feed the remainder. The feeds may be separate (spatially and chronologically). Some or all of the components to be fed may be fed in preemulsified form. To initiate the polymerization the thermal initiator may be entirely within the initial charge, or partly within the initial charge and partly fed, or exclusively fed.

Once the polymerization is complete, postpolymerization may be carried out by known methods to remove residual monomer, for example using redox-catalyst-initiated postpolymerization. Volatile residual monomers may also be removed by distillation, preferably at reduced pressure, and, if desired, by passing inert carrier gases, such as air, nitrogen or water vapour, through or over the product.

The aqueous dispersions obtainable by the process according to the invention have a solids content of from 30 to 75% by weight, preferably from 40 to 65% by weight. To prepare the water-redispersible polymer powders the aqueous dispersions are dried, for example by fluidized-bed drying, freeze drying or spray drying. The dispersions are preferably spray dried. The spray drying takes place in conventional spray drying systems, with atomization by single-, twin- or multifluid nozzles or by a rotating disc. The discharge temperature is generally chosen within the range from 55 to 100° C., preferably from 70 to 90° C., depending on the system, the Tg of the resin and the desired degree of drying.

The total amount of protective colloid prior to the drying procedure should preferably be at least 10% by weight, based on the polymer content. To ensure redispersibility it is generally necessary to add further protective colloids to the dispersion prior to the drying, as spraying aids. The amount of spraying aids usually used is from 5 to 25% by weight, based on the polymeric constituents of the dispersion.

Suitable spraying aids are partially hydrolysed polyvinyl acetates; polyvinylpyrrolidones; poly saccharides in a water-soluble form, such as starches, (amylose and amylopectin), celluloses and their carboxymethyl, methyl, hydroxyethyl or hydroxypropyl derivatives; proteins, such as casein or caseinate, soy protein, gelatines, ligninsulphonates, synthetic polymers, such as poly(meth)acrylic acid, copolymers of (meth)acrylates with carboxy-functional comonomer units, poly(meth)acrylamide, polyvinylsulphonic acids and water-soluble copolymers of these; melamineformaldehydesulphonates, naphthaleneh-formaldehyde sulphonates, styrene-maleic acid copolymers and vinyl ether-maleic acid copolymers. The spraying aids whose use is preferred are partially hydrolysed polyvinyl acetates with a degree of hydrolysis of from 80 to 95 mol %, with a Höppler viscosity of from 1 to 30 mPas, and these may, if desired, have been modified with isopropenyl acetate units or with vinyl ester units.

The content of up to 1.5% by weight of antifoam, based on the base polymer, has frequently proved advantageous during spraying. To increase storage stability by improving blocking resistance, in particular in the case of powders with a low glass transition temperature, the powder obtained may be mixed with an antiblocking agent (anticaking agent), preferably up to 30% by weight, based on the total weight of polymeric constituents. Examples of antiblocking agents are calcium carbonate, magnesium carbonate, talc, gypsum, silica and silicate with particle sizes preferably within the range from 10 nm to 10 μm.

To improve performance, other additives may be added during spraying. Examples of other constituents present in preferred embodiments of dispersion powder compositions are pigments, fillers, foam stabilizers, and hydrophobicizing agents.

The water-redispersible, protective-colloid-stabilized polymer powders may be used in the application sectors in which these are typically used.

The examples below serve to explain the invention further:

EXAMPLE 1

1110 ml of deionized water and 655 g of a 20% strength aqueous solution of a partially hydrolysed polyvinyl acetate with a degree of hydrolysis of 88 mol % and with a Höppler viscosity of 4 mPas for the 4% strength solution (DIN 53015, Höppler method at 20° C.) formed an initial charge in a stirred autoclave of about 5 l capacity. The pH was adjusted to 4.0–4.2 using 10% strength by weight formic acid. This was followed by evacuation, nitrogen flushing, reevacuation and introducing into the evacuated vessel a mixture made from 112 g of styrene, 168 g of 1,3-butadiene and 8 g of tert-dodecyl mercaptan. After heating to 80° C. the polymerization was initiated by simultaneously running in two catalyst solutions. The first of these was composed of 110 g of deionized water and 15.5 g of a 40% strength aqueous tert-butyl hydroperoxide solution. The other was composed of 116 g of deionized water and 13 g of sodium formaldehydesulphoxylate. The two catalyst solutions were fed at the same rate (18 ml/h). Once the polymerization had started the feed of a mixture of 951 g of 1,3-butadiene, 634 g of styrene and 9 g of tert-dodecyl mercaptan was begun at 5.3 g/min. There was a simultaneous feed of 245 g of a 20% strength by weight aqueous solution of a partially hydrolysed polyvinyl acetate with a degree of hydrolysis of 88 mol % and with a Höppler viscosity of 4 mPas for the 4% strength solution (DIN 53015, Höppler method at 20° C.) at 0.82 g/min. Once the monomer feed and polyvinyl alcohol feed had ended, postpolymerization was carried out for 2 h at 80° C. with an unchanged initiator solution feed rate, and then the initiator solution feed was terminated. The mixture was then cooled. This gave a stable, coarse-particle (Coulter LS 230; Dw =2.54 m) coagulate-free dispersion with a solids content of 49.4% and a viscosity (Brookfield viscometer, 20° C., 20 rpm) of 270 mPas.

400 parts by weight of the dispersion were mixed thoroughly with 200 parts by weight of a 10.3% strength by weight solution of a polyvinyl alcohol (partially hydrolysed polyvinyl acetate, degree of hydrolysis 88 mol %, viscosity of the 4% strength solution 13 mPas), 0.84 parts by weight of antifoam and 135 parts by weight of water. The dispersion was sprayed through a twin-fluid nozzle. The spraying component used was compressed air at 4 bar, and the droplets formed were dried with cocurrent air heated to 125° C. The resultant dry powder was mixed with 10% of commercially available antiblocking agent (a mixture of calcium magnesium carbonate and magnesium hydrosilicate).

EXAMPLE 2

The dispersion was prepared as in Example 1 using a total of 900 g of a 20% strength by weight aqueous solution of a partially hydrolysed polyvinyl acetate with a degree of hydrolysis of 88 mol % and with a Höppler viscosity of 4 mPas for the 4% strength solution. 468 g of the aqueous polyvinyl alcohol solution here were used as an initial charge in the pressure reactor and the remaining 432 g were used as a feed during the polymerization as described in Example 1. This gave a stable, coarse-particle (Coulter LS 230; Dw=2.73 µm) coagulate-free dispersion with a solids content of 49.9% and a viscosity (Brookfield viscometer 20° C., 20 rpm) of 260 mPas. The action taken to prepare the dispersion powder was as in Example 1.

EXAMPLE 3

The dispersion was prepared as in Example 1 using a total of 900 g of a 20% strength by weight aqueous solution of a partially hydrolysed polyvinyl acetate with a degree of hydrolysis of 88 mol % and with a Höppler viscosity of 4 mPas for the 4% strength solution. 281 g of the aqueous polyvinyl alcohol solution here were used as an initial charge in the pressure reactor and the remaining 619 g were used as a feed during the polymerization as described in Example 1. This gave a stable, coarse-particle (Coulter LS 230; Dw=2.63 µm) coagulate-free dispersion with a solids content of 49.8% and a viscosity (Brookfield viscometer 20° C., 20 rpm) of 18,400 mPas. All of the other actions taken were as in Example 1.

EXAMPLE 4

The dispersion was prepared as in Example 1 using a total of 900 g of a 20% strength by weight aqueous solution of a partially hydrolysed polyvinyl acetate with a degree of hydrolysis of 88 mol % and with a Höppler viscosity of 4 mPas for the 4% strength solution. 720 g of the aqueous polyvinyl alcohol solution here were used as an initial charge in the pressure reactor and the remaining 180 g were used as a feed during the polymerization as described in Example 1. This gave a stable, coarse-particle (Coulter LS 230; Dw=2.60 µm) coagulate-free dispersion with a solids content of 49.0% and a viscosity (Brookfield viscometer 20° C., 20 rpm) of 300 mPas. All of the other actions taken were as in Example 1.

EXAMPLE 5

The dispersion was prepared as in Example 1 using a total of 1000 g of a 20% strength by weight aqueous solution of a yellow dextrin (Avedex 35). 500 g here were used as an initial charge in the pressure reactor and the remaining 500 g were used as a feed during the polymerization as described in Example 1. This gave a stable, coarse-particle (Coulter LS 230; Dw=2.80 µm) coagulate-free dispersion with a solids content of 49.8% and a viscosity (Brookfield viscometer 20° C., 20 rpm) of 310 mPas. All of the other actions taken were as in Example 1.

EXAMPLE 6

The dispersion was prepared as in Example 1, using 37 g of acrylic acid as an initial charge and using a total of 1000 g of a 20% strength by weight aqueous solution of hydroxypropylcellulose (Kucel L), of which 500 g were used as an initial charge in the pressure reactor and the remaining 500 g were used as a feed during the polymerization as described in Example 1. This gave a stable, coarse-particle (Coulter LS 230; Dw=2.74 µm) coagulate-free dispersion with a solids content of 48.0% and a viscosity (Brookfield viscometer 20° C., 20 rpm) of 420 mPas. All of the other actions taken were as in Example 1.

EXAMPLE 7

The dispersion was prepared as in Example 1, using 37 g of acrylic acid as an initial charge and using a total of 1000 g of a 20% strength by weight aqueous starch solution (Nylgum), of which 500 g were used as an initial charge in the pressure reactor and the remaining 500 g were used as a feed during the polymerization as described in Example 1. This gave a stable, coarse-particle (Coulter LS 230; Dw=2.86 µm) coagulate-free dispersion with a solids content of 48.4% and a viscosity (Brookfield viscometer 20° C., 20 rpm) of 500 mPas. All of the other actions taken were as in Example 1.

Comparative Example 1

The dispersion was prepared as in Example 1, the entire amount of 900 g of the 20% strength by weight aqueous solution of the partially hydrolysed polyvinyl acetate with a degree of hydrolysis of 88 mol % and with a Höppler viscosity of 4 mPas for the 4% strength solution being used as an initial charge in the pressure reactor. All of the other actions taken were as in Example 1. This gave a stable, coarse-particle (Coulter LS 230; Dw=2.57 µm) coagulate-free dispersion with a solids content of 49.3% and a viscosity (Brookfield viscometer 20° C., 20 rpm) of 275 mPas. The dispersion powder was prepared as in Example 1.

Comparative Example 2

The dispersion was prepared as in Example 1, the entire amount of 900 g of the 20% strength by weight aqueous solution of the partially hydrolysed polyvinyl acetate with a degree of hydrolysis of 88 mol % and with a Höppler viscosity of 4 mPas for the 4% strength solution being used as a feed into the pressure reactor. All of the other actions taken were as in Example 1. This gave an incompletely polymerized, very coarse-particle (Coulter LS 230; Dw=4.37 µm) high-coagulate dispersion with a solids content of 32.1% and a viscosity (Brookfield viscometer 20° C., 20 rpm) of 75 mPas. The dispersion powder was prepared as in Example 1.

Comparative Example 3

The dispersion was prepared as in Example 1, the entire amount (900 g) of the 20% strength by weight aqueous solution of the partially hydrolysed polyvinyl acetate with a degree of hydrolysis of 88 mol % and with a Höppler viscosity of 4 mPas for the 4% strength solution, and also the total amount of styrene, 1,3-butadiene and tert-dodecyl mercaptan being used as a feed into the pressure reactor. All of the other actions taken were as in Example 1. This gave an incompletely polymerized, coarse-particle (Coulter LS 230; Dw=3.72 μm) high-coagulate dispersion with a solids content of 26.1% and a viscosity (Brookfield viscometer 20° C., 20 rpm) of 63 mPas.

Redispersion Behaviour of the Polymer Films

The dispersions from the examples mentioned were used to produce films of 0.2 mm thickness on glass plates and the films were dried at 105° C. for 15 minutes. To check film redispersibility one droplet of water was applied using a pipette at room temperature to a homogeneous part of each film to be tested, and after allowing 60 seconds for the water droplet to take effect, a fingertip was used to rub the same area until this area of the glass plate was free from film, or the film fragmented, or remained intact.

The redispersibility of the polymer films was assessed using the following evaluation scale:

Grade 1: Rubbing lightly immediately redisperses the film, or it redisperses spontaneously;

Grade 2: Rubbing redisperses the film, but some film fragments may be difficult to disperse;

Grade 3: Vigorous rubbing was required to redisperse the film, with fragmentation of the film;

Grade 4: Even after prolonged vigorous rubbing the film does not redisperse, but fragments.

Determination of the Sedimentation Behaviour of the Powder (Tube Sedimentation)

To determine sedimentation behaviour, 50 g of each dispersion powder were redispersed in 50 ml of water, then diluted to 0.5% solids content, and the height of settled solids was measured for 100 ml of this redispersion poured into a graduated tube, settlement being measured after 1 hour.

Determination of Blocking Resistance

To determine blocking resistance, the dispersion powder was placed in an iron pipe (diameter: 5 cm) with a thread, and then subjected to a load from a metal ram (weight: 3 kg). The application of the load was followed by storage for 16 hours at 50° C. in a drying cabinet. After cooling to room temperature, the powder was removed from the tube and resistance to blocking was determined qualitatively by crushing the powder. Blocking resistance was classified as follows:

1=very good blocking resistance

2=good blocking resistance

3=satisfactory blocking resistance

4=not resistant to blocking—powder after crushing no longer free-flowing.

Determination of Air Content in the Mortar

A DIN mortar to DIN 1164 was mixed with the formulation below with a water-cement factor W/C of 0.45 and a polymer-cement factor P/C of 0.15:

| PZ-35F Portland cement | 900 g |
|---|---|
| Standard sand | 2700 g |
| S-860 Silicone antifoam (Wacker Chemie) | 7.2 g |

-continued

| Dispersion powder | 135 g |
|---|---|
| Water | 405 g |

Air content was determined using DIN 18555 Part 2.

Determination of Cement Stability

A cement mix was prepared with the following formulation:

| Portland cement | 82.5 g |
|---|---|
| Calcite (CaCO)$_3$ 10–40 mm | 75 g |
| Quartz sand 200–500 mm | 128 g |
| Dispersion powder | 15 g |
| Water | 85 g |

The workability of the cement mix was observed over a period of 2 hours and assessed qualitatively.

The test results are given in Table 1.

TABLE 1

| Example | Film redispersibility | Tube sedimentation 1 h [cm] | Blocking resistance | Air content in mortar | Cement stability |
|---|---|---|---|---|---|
| Ex. 1 | Grade 1 | 0.1 | 2 | 6% | 2 h |
| Ex. 2 | Grade 1 | 0.1 | 2 | 4% | 2 h |
| Ex. 3 | Grade 4 | 0.2 | 2 | 5% | 2 h |
| Ex. 4 | Grade 2 | 0.3 | 2 | 5% | 1.5 h |
| Ex. 5 | Grade 1 | 0.2 | 2 | 7% | 2 h |
| Ex. 6 | Grade 1 | 0.1 | 2 | 6% | 2 h |
| Ex. 7 | Grade 2 | 0.3 | 2 | 5% | 2 h |
| Comp. Ex. 1 | Grade 4 | 0.4 | 2 | 4% | 15 minutes |
| Comp. Ex. 2 | Grade 4 | 1.1 | 3 | — | 15 minutes |
| Comp. Ex. 3 | Grade 4 | 3.1 | 3 | — | 15 minutes |

The procedure according to the invention can give dispersion powders based even on copolymers of hydrophobic comonomers, such as styrene and butadiene. The powders have very good redispersibility (tube sedimentation) and very good performance (cement stability). If the content of protective colloid is entirely used as initial charge or entirely used as feed during the emulsion polymerization, both the redispersibility of the resultant powders and their performance are unsatisfactory.

We claim:

1. Process for preparing protective-colloid-stabilized vinlyaromatic-1,3-diene copolymers in the form of their aqueous polymer dispersions or in the form of their water-redispersible powders, by emulsion polymerization of a mixture comprising at least one vinylaromatic monomer and comprising at least one 1,3-diene monomer in the presence of protective colloid and, optionally, drying the resultant polymer dispersions, wherein some of the protective colloid is used as an initial charge and some of the protective colloid is used as a feed, and wherein the weight ratio of protective colloid initially present to monomers initially present is from 0.1:1 to 0.9:1, and wherein from 2 to 90 percent by weight of total protective colloid is used in the initial charge, and the remainder is metered as said feed.

2. Process according to claim 1, wherein use is made of mixtures with from 20 to 80% by weight of vinylaromatic and from 20 to 80% by weight of 1,3-diene, where the mixtures may, optionally, also comprise other monomers and the per cent by weight data always give a total of 100% by weight.

3. Process according to claim 2, wherein styrene and 1,3-butadiene are copolymerized.

4. Process according to any of claims 1 to 3, wherein the protective colloid used comprises one or more selected from the group consisting of fully and partially hydrolysed polyvinyl acetates, partially hydrolysed hydrophobicized polyvinyl acetates, polyvinylpyrrolidones, starches, celluloses, carboxymethyl-, methyl-, hydroxyethyl- and hydroxypropylcellulose, proteins, poly(meth)acrylic acid, poly(meth)acrylamide, polyvinylsulphonic acids, melamine-formaldehydesulphonates, naphthalene formaldehydesulphonates, styrene-maleic acid copolymers, vinyl ether-maleic acid copolymers, and dextrins.

5. Process according to claim 4, wherein the polymerization is carried out in the presence of partially hydrolysed polyvinyl acetate with a degree of hydrolysis of from 80 to 95 mol % and with a Höppler viscosity of from 1 to 30 mPas.

6. Process according to claim 5, wherein from 0.05 to 10% by weight, based on the total weight of the monomer mixture, of auxiliary monomers selected from the group consisting of ethylenically unsaturated mono- and dicarboxylic acids, ethylenically unsaturated carboxamides, ethylenically unsaturated carbonitriles, mono- and diesters of fumaric acid or of maleic acid, ethylenically unsaturated sulphonic acids and salts of these, precrosslinked comonomers having two or more ethylenic unsaturated bonds, postcrosslinking comonomers, epoxy-functional comonomers, silicon-functional comonomers and comonomers having hydroxyl or CO groups are also copolymerized.

7. Process according to claim 6, wherein the polymer dispersion is dried by spray drying, if desired after adding further protective colloids.

8. A process for preparing protective-colloid-stabilized vinylaromatic-1,3-diene copolymers in the form of their aqueous polymer dispersions or in the form of their water-redispersible powders, comprising emulsion polymerizing a mixture comprising at least one vinylaromatic monomer and at least one 1 3-diene monomer in the presence of a protective colloid to produce a polymer dispersion, and optionally drying the polymer dispersion, wherein some of the protective colloid is included in the initial charge and some of the protective colloid is added as a feed, and wherein the polymerization takes place in the absence of emulsifier, and wherein the weight ratio of protective colloid initially present to monomers initially present is from 0.1:1 to 0.9:1, and wherein from 2 to 90 percent by weight of total protective colloid is used in the initial charge, and the remainder is metered as said feed.

9. The process of claim 8, wherein mixture comprises from 20 to 80% by weight of vinylaromatic monomer(s), from 20 to 80% by weight of 1,3-diene monomer(s), and optionally other monomer, and the per cents by weight of the individual monomers total 100%.

10. The process of claim 8, wherein styrene and 1,3-butadiene are copolymerized.

11. The process of claim 8, wherein the protective colloid used comprised at least one of fully partially hydrolysed polyvinyl acetates, partially hydrolysed hydrophobicized polyvinyl acetates, polyvinylpyrrolidones, starches, celluloses, carboxymethyl-, methyl-, hydroxyethyl- and hydroxypropylcelluloses, proteins, poly(meth)acrylic acid, poly(meth)acrylamide, polyvinylsulphonic acids, metaminsformaldehydesulphonates, naphthalene, formaldehydesulphonates, styrene-maleic acid copolymers, vinyl ester-maleic acid copolymers, and dextrins.

12. The process of claim 8, wherein the polymerization is carried out in the presence of partially hydrolysed polyvinyl acetate with a degree of hydrolysis of from 80 to 95 mol % and with a Höppler viscosity of from 1 to 30 mPas.

13. The process of claim 8, wherein from 0.05 to 10% by weight, based on the total weight of the monomer mixture, of at least one of ethylenically unsaturated mono- and dicarboxylic acids, ethylenically unsaturated carboxamides, ethylenically unsaturated carbonitrile mono- and diasters of fumaric acid or of maleic acid, ethylenically unsaturated sulphonic acids and salts of these, precrosslinked comonomers having two or more ethylenic unsaturated bonds, postcrosslinking comonomers, epoxy-functional comonomers, silicon-functional comonomers and comonomers having hydroxyl or CO groups are also capolymerized.

14. The process of claim 8, wherein the polymer dispersion is dried by spray drying, optionallt after adding further protective colloids.

15. In a cementitious composition employing a redispersible polymer powder prepared by emulsion polymerization of from 20 to 80 weight percent of vinyl aromatic monomer, from 80 to 20 weight percent of a 1,3-diene monomer, and optionally up to 30 weight percent of other comonomers, the weight precents based on the total weight of the redispersible polymer, the improvement comprising selecting as said radispersible polymer powder the redispersible polymer powder prepared by the process of claim 1.

16. In a cementitious composition employing a redispersible polymer powder prepared by emulsion polymerization of from 20 to 80 weight percent of vinyl aromatic monomer, from 80 to 20 weight percent of a 1,3-diene monomer, and optionally up to 30 weight percent of other comonomers, the weight percents based on the total weight of the redispersible polymer, the improvement comprising selecting as said redispersible polymer powder the redispersible polymer powder prepared by the process of claim 3.

17. In a cementitious composition employing a redispersible polymer powder prepared by emulsion polymerization of from 20 to 80 weight percent of vinyl aromatic monomer, from 80 to 20 weight percent of a 1,3-diene monomer, and optionally up to 30 weight percent of other comonomers, the weight precents based on the total weight of the redispersible polymer, the improvement comprising selecting as said redispersible polymer powder the redispersible polymer powder by the process of claim 8.

18. In a cementitious composition employing a redispersible polymer powder prepared by emulsion polymerization of from 20 to 80 weight percent of vinyl aromatic monomer, from 80 to 20 weight percent of a 1,3-diene monomer, and optionally up to 30 weight percent of other comonomers, the weight precents based on the total weight of the redispersible polymer, the improvement comprising selecting as said redispersible polymer powder the redispersible polymer powder by the process of claim 12.

* * * * *

UNITED STATES PATENT AND TRADEMARK OFFICE
CERTIFICATE OF CORRECTION

PATENT NO.     : 6,590,022 B1
DATED          : July 8, 2003
INVENTOR(S)    : Thomas Bastelberger et al.

It is certified that error appears in the above-identified patent and that said Letters Patent is hereby corrected as shown below:

Column 11,
Line 57, delete "comprised" and insert therefor -- comprises --.

Column 12,
Line 2, delete "metainsformaldehydesulphonates" and insert therefor -- melamineformaldehydesulphonates --.
Line 13, delete "diasters" and insert therefor -- diesters --.
Line 31, delete "radispersible" and insert therefor -- redispersible --.

Signed and Sealed this

Eleventh Day of November, 2003

JAMES E. ROGAN
*Director of the United States Patent and Trademark Office*